United States Patent
Hariri et al.

(10) Patent No.: US 12,421,942 B2
(45) Date of Patent: *Sep. 23, 2025

(54) PV CLEANING SYSTEM WITH RACK AND PINION WIPER

(71) Applicant: Imam Abdulrahman Bin Faisal University, Dammam (SA)

(72) Inventors: Nasir Ghazi Hariri, Dammam (SA); Ibrahim Khalil Almadani, Khobar (SA); Ibrahim Sufian Osman, Khobar (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/813,156

(22) Filed: Aug. 23, 2024

(65) Prior Publication Data
US 2024/0410344 A1 Dec. 12, 2024

Related U.S. Application Data

(63) Continuation of application No. 18/739,506, filed on Jun. 11, 2024, now Pat. No. 12,110,880, which is a (Continued)

(51) Int. Cl.
*F03G 7/06* (2006.01)
*F24S 20/60* (2018.01)
(Continued)

(52) U.S. Cl.
CPC .......... *F03G 7/06145* (2021.08); *F24S 20/60* (2018.05); *F24S 40/20* (2018.05);
(Continued)

(58) Field of Classification Search
CPC ........ H02S 40/10; F03G 7/065; F03G 7/0614; F03G 7/06145; Y02E 10/40–60; F24S 40/20
See application file for complete search history.

(56) References Cited

U.S. PATENT DOCUMENTS

| 8,443,600 B2 | 5/2013 | Butera |
| 9,816,492 B2 | 11/2017 | Pretorius |
| (Continued) | | |

FOREIGN PATENT DOCUMENTS

| CN | 109981040 A | 7/2019 |
| KR | 2021/0119650 A | 10/2021 |
| (Continued) | | |

OTHER PUBLICATIONS

Hairi, et al. ; A State-of-the-Art Self-Cleaning System Using Thermomechanical Effect in Shape Memory Alloy for Smart Photovoltaic Applications ; MDPI Materials, 15 : Aug. 18, 2022 ; 21 Pages.

(Continued)

*Primary Examiner* — Laert Dounis
(74) *Attorney, Agent, or Firm* — Oblon, McClelland, Maier &Neustadt, L.L.P.

(57) ABSTRACT

The present disclosure provides a thermomechanical actuator and a cleaning system implementing the thermomechanical actuator. The thermomechanical actuator includes a solar heat collector (SHC) housing shape memory alloy springs connected between a piston movably disposed therein and one end of the SHC. A cable extending from the piston through an opposite end of the SHC is connected to a bias load that develops returning force on the springs. In presence of solar radiation, the springs contract and cause linear movement of the piston in a direction of contraction and, in absence of the solar radiation, the springs expand and cause linear movement of the piston in direction of expansion. Useful power and work is extracted in form of the cleaning system from such linear movement of the piston.

6 Claims, 5 Drawing Sheets

Related U.S. Application Data continuation of application No. 18/599,798, filed on Mar. 8, 2024, now Pat. No. 12,025,109, which is a continuation of application No. 18/160,042, filed on Jan. 26, 2023, now Pat. No. 11,976,641.

(51) Int. Cl.
*F24S 30/00* (2018.01)
*F24S 40/20* (2018.01)
*H02S 40/10* (2014.01)

(52) U.S. Cl.
CPC ......... H02S 40/10 (2014.12); *F24S 2030/115* (2018.05); *Y02E 10/46* (2013.01); *Y02E 10/50* (2013.01)

(56) References Cited

U.S. PATENT DOCUMENTS

| | | | | |
|---|---|---|---|---|
| 11,976,641 B1 * | 5/2024 | Hariri | ................. | F24S 20/60 |
| 12,025,109 B1 * | 7/2024 | Hariri | ................. | F03G 7/06145 |
| 12,110,880 B1 * | 10/2024 | Hariri | ................. | F24S 10/00 |
| 2012/0297763 A1 | 11/2012 | Mankame | | |
| 2020/0271107 A1 | 8/2020 | Patten | | |

FOREIGN PATENT DOCUMENTS

| | | |
|---|---|---|
| WO | 2012/104873 A1 | 8/2012 |
| WO | 2017/103409 A1 | 6/2017 |
| WO | 2018/079930 A1 | 5/2018 |

OTHER PUBLICATIONS

Almadani, Ibrahim Khalil, et al. "In-Depth Assessment and Optimized Actuation Method of a Novel Solar-Driven Thermomechanical Actuator via Shape Memory Alloy." Energies, vol. 15, No. 10, May 2022, p. 3807. doi.org/10.3390/en15103807 (Year: 2022).

Osman, Ibrahim Sufian, and Nasir Ghazi Hariri. "Thermal Investigation and Optimized Design of a Novel Solar Self-Driven Thermomechanical Actuator." Sustainability, vol. 14, No. 9, Apr. 2022, p. 5078. doi.org/10.3390/su14095078 (Year: 2022).

N. Hariri, "A Study of a Scissor-like Lift Manipulator for the Actuation Mechanism of a Self Cleaning System Using Shape Memory Alloy," 2021 6th International Conference on Smart and Sustainable Technologies (SpliTech), Bol and Split, Croatia, 2021, pp. 1-6, doi: 10.23919/SpliTech52315.2021.9566349. (Year: 2021).

Nasir Hariri, "A novel dust mitigation technology solution of a self-cleaning method for a PV module capable of harnessing reject heat using shape memory alloy", Case Studies in Thermal Engineering, vol. 32, 2022, 101894, ISSN 2214-157X, https://doi.org/10.1016/j.csite.2022.101894 (Year: 2022).

* cited by examiner

PV CLEANING SYSTEM WITH RACK AND PINION WIPER

CROSS-REFERENCE TO RELATED APPLICATIONS

The present application is a Continuation of U.S. application Ser. No. 18/739,506, now allowed, having a filing date of Jun. 11, 2024, which is a Continuation of U.S. application Ser. No. 18/599,798, now U.S. Pat. No. 12,025,109, having a filing date of Mar. 8, 2024, which is a Continuation of U.S. application Ser. No. 18/160,042, now U.S. Pat. No. 11,976,641, having a filing date of Jan. 26, 2023.

STATEMENT REGARDING PRIOR DISCLOSURES BY THE INVENTOR(S)

Aspects of this technology are described by Almadani, Ibrahim Khalil, et al. "In-Depth Assessment and Optimized Actuation Method of a Novel Solar-Driven Thermomechanical Actuator via Shape Memory Alloy." Energies, vol. 15, no. 10, May 2022, p. 3807. doi.org/10.3390/en15103807, Osman, Ibrahim Sufian, and Nasir Ghazi Hariri. "Thermal Investigation and Optimized Design of a Novel Solar Self-Driven Thermomechanical Actuator." Sustainability, vol. 14, no. 9, April 2022, p. 5078. doi.org/10.3390/su14095078, and Hariri, Nasir Ghazi, et al. "A State-of-the-Art Self-Cleaning System Using Thermomechanical Effect in Shape Memory Alloy for Smart Photovoltaic Applications." Materials, vol. 15, no. 16, August 2022, p. 5704. doi.org/10.3390/ma15165704.

STATEMENT OF ACKNOWLEDGEMENT

The inventor(s) gratefully acknowledge the financial support provided by Imam Abdulrahman Bin Faisal University, Kingdom of Saudi Arabia under project ID 2022-003-Eng.

BACKGROUND

Technical Field

The present disclosure relates to an apparatus, system, and method for harvesting radiation energy, such as solar radiation, and more particularly relates to thermomechanical actuators implementing shape memory alloys which are responsive to temperature change caused by the presence and/or absence of such harvested radiation energy.

Discussion of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Although many renewable energy sources are available, solar photovoltaic (PV) energy is most one of the most commonly known forms of renewable energy. However, an efficiency of PV modules is a concern, and the efficiency may be affected by multiple factors, including dust accumulation or soiling effect on a top surface of the PV modules. The dust accumulation is a common issue in areas with high dust intensity. Multiple factors which affect the dust accumulation include, for example, but not limited to, humidity, adhesion force, rain rate, cover glass of the PV modules, wind speed, direction of wind, and gravity. Since the soiling develops a layer on the top surface (such as glass) of the PV modules, light transmissivity through the top surface may be reduced and result in significant reduction in efficiency of the PV modules. Furthermore, a soiling layer on the top surface of the PV modules leads to other degradation effects which shorten a life span thereof. Although several active and passive cleaning methods have been developed to eliminate such soiling effect, achieving a passive cleaning system without human intervention has remained a challenge.

Active materials, such as shape memory alloys (SMA) and shape memory polymers (SMP), are known to convert energy harvested from an activation signal into work. Upon deactivation (i.e., termination of exposure to the activation signal), the active material typically reverts to its original state. The use of active materials increases energy efficiency, while reducing weight and complexity in comparison to counterpart electro-mechanical, hydraulic, and pneumatic motors. However, the active materials are mostly implemented in systems where the active materials rely upon artificially generated signals (such as an electric current, magnetic field, or voltage drop) created by an automated and/or manually initiated source. Such artificial generated signals also demands human intervention, for example, for purpose of controlling power supply, and thereby increases operation and cost of overall system.

Accordingly, an objective of the present disclosure is to provide a system that utilizes the abundant solar energy and the active materials which may be actuated using the solar energy to address the soiling effect of the PV modules and eliminate human intervention.

SUMMARY

According to one aspect of the present disclosure, a thermomechanical actuator is disclosed. The thermomechanical actuator includes a piston, a solar heat collector, a plurality of springs, a rod, a pulley, a bias load, and a cable. The solar heat collector is in the form of a tube capped on opposing ends with a back cover plate and a front cover plate of equal dimensions, and the solar heat collector contains the plurality of springs. The piston is housed in the interior of the solar heat collector and the rod passes through the center of the back cover plate. A first end of each spring of the plurality of springs is connected to an interior surface of the front cover plate and a second end of each spring of the plurality of springs is connected to a back face of the piston. A first end of the rod is connected to the back face of the piston in line with the plurality of springs with a front face of the piston being attached to a pulley system. The pulley system includes the cable, the bias load, and the pulley. The cable is attached to the front face of the piston centrally disposed in the solar heat collector and passes through the back cover plate. The cable runs linearly through the solar heat collector and is attached to the pulley and the bias load. The bias load includes a mass providing tension to the cable.

In some embodiments, the plurality of springs is comprised of a memory shape alloy. The plurality of springs is configured in a first state at a first temperature and in a second state at a second temperature, the first state corresponds to the springs in contraction and the second state corresponds to the springs being relaxed. A value of the first temperature is greater than a value of the second temperature.

In some embodiments, the solar heat collector is a triangular tube with the front cover plate and the back cover plate being of an equilateral triangle shape. The rod passes through the center of the back cover plate and through the center of the front cover plate. A base of the triangular tube faces upwards and includes a transparent material. The piston face matches the triangular shape of the front cover plate and the back cover plate.

In some embodiments, the plurality of springs is configured to contract linearly parallel to the axis of the triangular tube.

In some embodiments, the bias load provides a return function for the spring system. The return function includes a tensile force applied to the plurality of springs, where the tensile force is applied by a mass of the bias load and draws the plurality of springs back to an equilibrium position.

In some embodiments, each of the plurality of springs is a nickel-titanium spring.

In some embodiments, the piston is a triangular plate attached to the rod and the plurality of springs. The rod is perpendicular to the triangular plate and runs through the center of the triangular plate. The triangular plate is configured to slide along an inside of the triangular tube of the solar heat collector in line with the plurality of springs.

In some embodiments, the thermomechanical actuator is configured to harness solar heat radiation with the solar heat collector to focus the solar heat radiation onto the plurality of springs. The solar heat collector is configured to transfer the solar heat radiation to the plurality of springs via a convective and a conductive process.

In some embodiments, the interior surfaces of the body of the solar heat collector comprise a reflective material.

In some embodiments, the plurality of springs exerts a range of forces varying from 2.95 N to 11.8 N.

In some embodiments, the plurality of springs is displaceable in a range of about 30 mm to about 50 mm.

In some embodiments, the cover plates include aluminum.

In some embodiments, the rod is configured to slide linearly parallel to the axis of the triangular tube.

According to another aspect of the present disclosure, a cleaning system is disclosed. The cleaning system includes a thermomechanical actuator described hereinabove, a gear mechanism, a cleaning spindle, and a photovoltaic panel. The piston of the thermomechanical actuator is attached to the gear mechanism that includes a rack and a pinion. The rack is mechanically attached to the pinion. The cleaning spindle is attached to a top face of the pinion. The thermomechanical actuator, the gear mechanism, and the cleaning spindle are fixed to the photovoltaic panel.

In some embodiments, the cleaning spindle includes a linear rod extending across a length of one side of the photovoltaic panel. The cleaning spindle is attached to the face of the pinion and rotates 90-degrees across the face of the photovoltaic panel.

In some embodiments, the rod of the thermomechanical actuator is configured to pass through the gear mechanism and is mechanically attached to the rack of the gear mechanism. The rack is fixed to the pinion and an extension of the rod rotates the pinion via the rack.

In some embodiments, the thermomechanical actuator is centrally attached to a side of the photovoltaic panel and the rod of the thermomechanical actuator extends in parallel with the side of the photovoltaic panel. The gear mechanism is attached to a corner of the photovoltaic panel and the cleaning spindle rests on a face of the photovoltaic panel.

In some embodiments, the cleaning system includes plurality of the thermomechanical actuators, a plurality of gear the mechanisms, and a plurality of the cleaning spindles. The plurality of thermomechanical actuators fixed to a plurality of sides of the photovoltaic panel, the plurality of gear mechanisms fixed to the plurality of thermomechanical actuators, and the plurality of cleaning spindles fixed to the plurality of gear mechanisms.

In some embodiments, the cleaning spindle has a linear brush fixed along an underside of the cleaning spindle.

In some embodiments, the solar heat collector of the thermomechanical actuator has three configurations. A first configuration is a cylindrical tube having a circular front cover, a cylindrical central volume, and a circular back cover. A second configuration is a triangular tube having an equilateral triangular front cover, a triangular central volume, and an equilateral triangular back cover. The third configuration is an isosceles trapezoid tube having isosceles trapezoid front cover, an isosceles trapezoid central volume, and an isosceles trapezoid back cover.

These and other aspects of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding, or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure relates to a thermomechanical actuator and methods of harvesting and converting energy from natural or ambient sources, using shape memory alloys or other active materials. As such, the present disclosure is useful, among other things, for taking advantage of abundant and free energy sources, such as the solar radiation. Moreover, to effect on-demand actuation, the thermomechanical actuator of the present disclosure is further useful for advantageously storing (i.e., retaining the harvested energy over a period, so as to enable delayed release) the activation energy harvested by the active materials.

Figure 1:
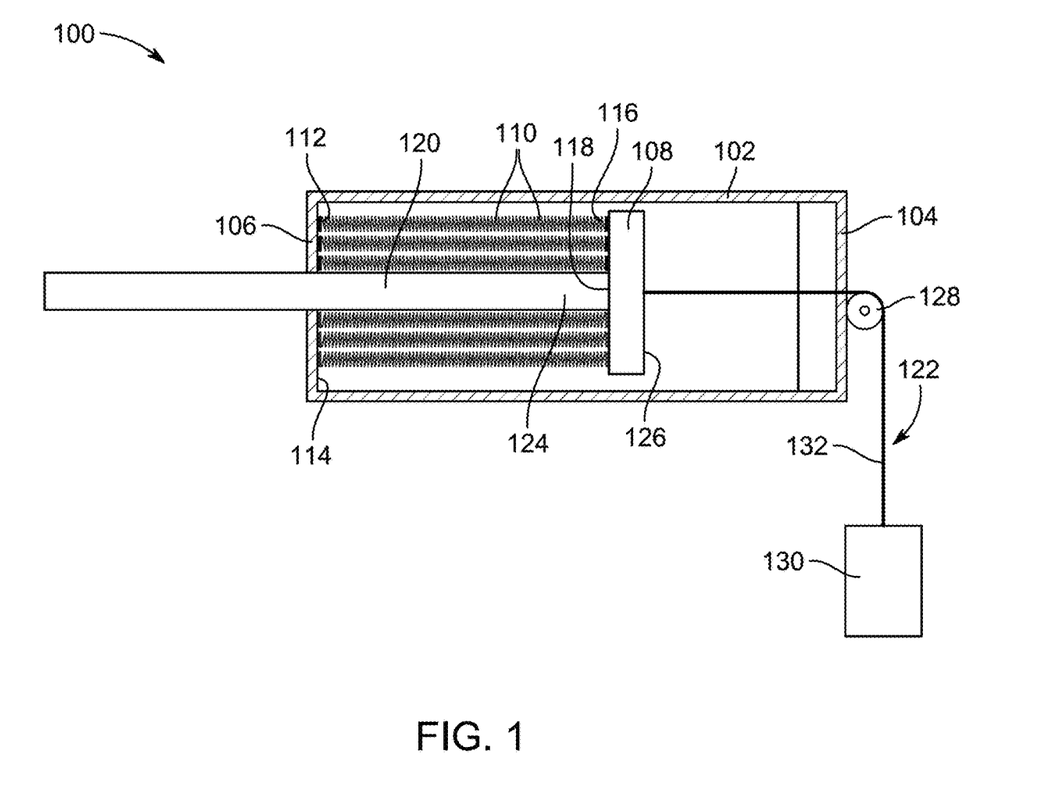
FIG. 1 illustrates a thermomechanical actuator, according to an embodiment of the present disclosure.

FIG. 1 illustrates a thermomechanical actuator 100, according to an embodiment of the present disclosure. The thermomechanical actuator 100 includes a solar heat collector 102 which is embodied as a tube capped on opposing ends with a back cover plate 104 and a front cover plate 106 preferably of equal dimensions. The thermomechanical actuator 100 further includes a piston 108 and a plurality of springs 110 housed in an interior of the solar heat collector 102. A first end 112 of each spring of the plurality of springs 110 is connected to an interior surface 114 of the front cover plate 106 and a second end 116 of each spring of the plurality of springs 110 is connected to a back face 118 of the piston 108. The thermomechanical actuator 100 further includes a rod 120 and a pulley system 122. A first end 124 of the rod 120 is connected to the back face 118 of the piston 108 in line with the plurality of springs 110 and the rod 120 extends through the front cover plate 106. A front face 126 of the piston 108 is attached to the pulley system 122.

The pulley system 122 includes a pulley 128 attached to the solar heat collector 102, a bias load 130, and a cable 132 extending between front face 126 of the piston 108 and the bias load 130 over the pulley 128. The cable 132 runs linearly through the solar heat collector 102 and passes through the back cover plate 104. The bias load 130 attached to the cable 132 has a mass configured to develop tension in the cable 132.

Figure 2A:
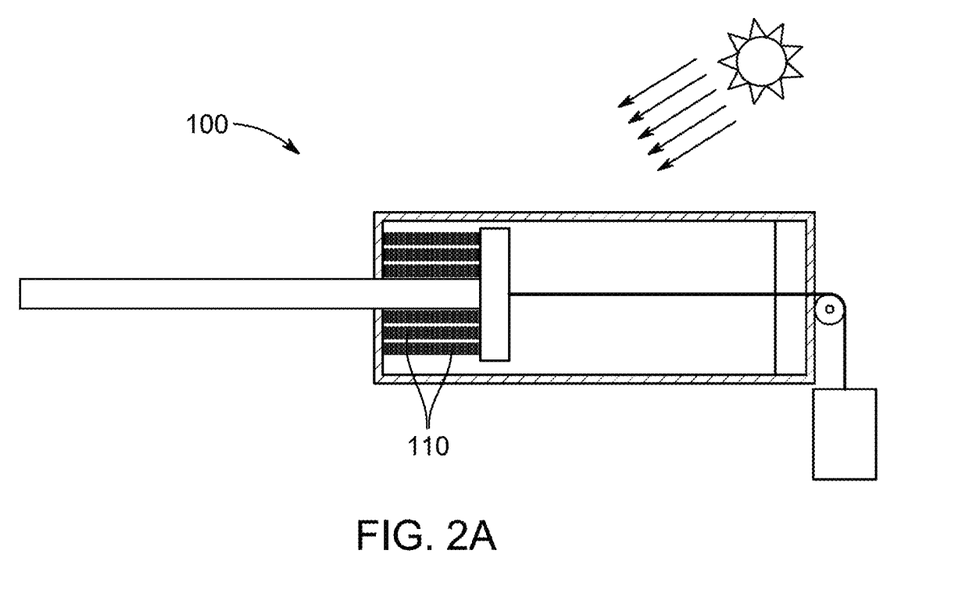
FIG. 2A illustrates an activated state of the thermomechanical actuator, according to an aspect of the present disclosure.
Figure 2B:
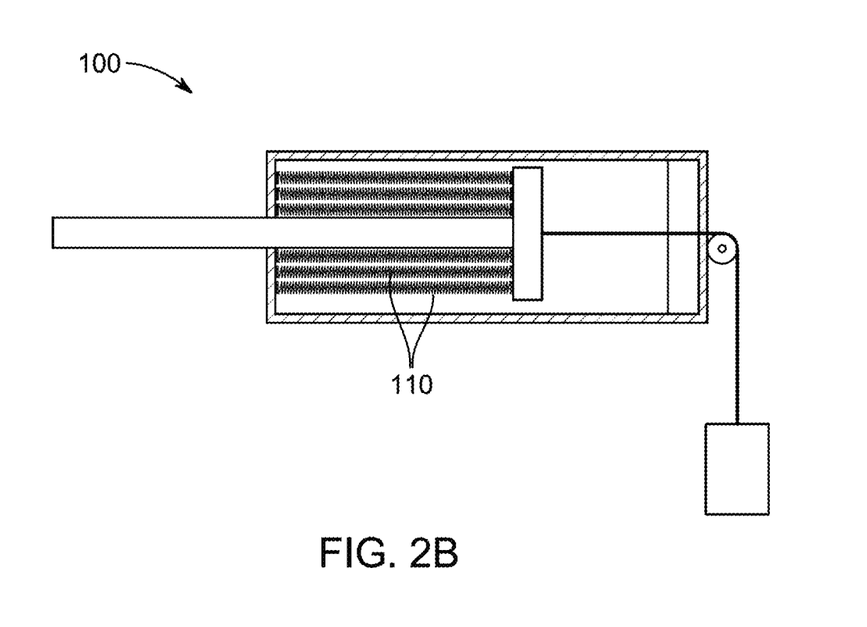
FIG. 2B illustrates a deactivated state of the thermomechanical actuator, according to an aspect of the present disclosure.

FIG. 2A illustrates an activated state of the springs 110 and FIG. 2B illustrates a deactivated state of the springs 110, according to aspects of the present disclosure. In an embodiment, each of the plurality of springs 110 are made of a shape memory metal alloy such as nickel-titanium springs. Preferably, the springs 110 are made of nickel titanium, also known as NiTINOL, which is a shape memory metal alloy of nickel and titanium, where the two elements are present in roughly equal atomic percentages. The nickel titanium alloy exhibits shape memory effect and super elasticity. The springs 110 are configured to attain a first state at a first temperature and a second state at a second temperature, where the first temperature is greater than the second temperature. According to an aspect of the present disclosure, during the day (or upon exposure to solar radiation or light), the springs 110 absorb solar radiation and attain the first state, which is a contracted state as shown in FIG. 2A, and during the night (or in the absence of solar radiation or light), the springs 110 attain the second state, which is a relaxed or expanded state as shown in FIG. 2B.

Figure 3:
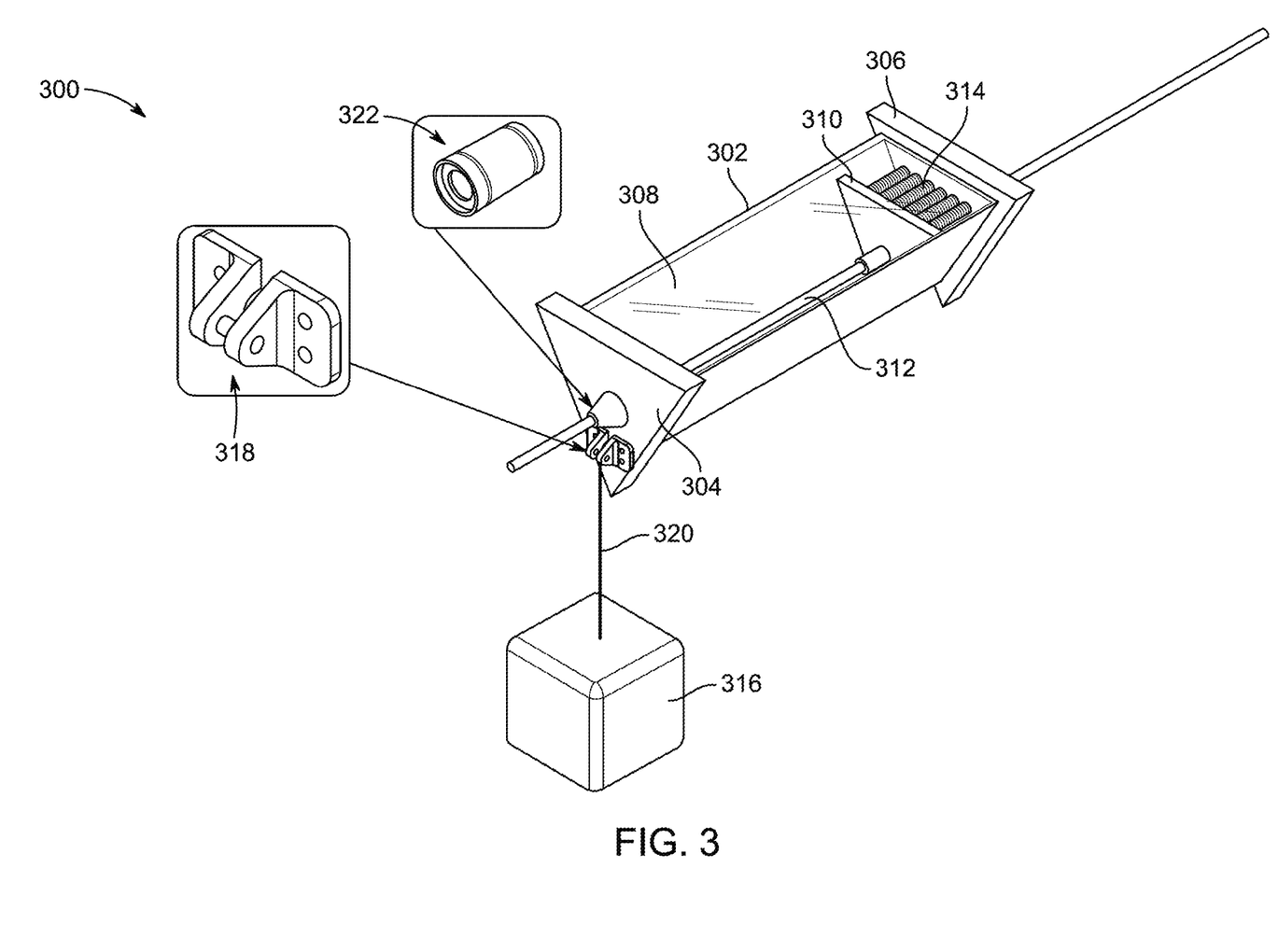
FIG. 3 illustrates a thermomechanical actuator, according to another embodiment of the present disclosure.

FIG. 3 illustrates a perspective view of a thermomechanical actuator 300, according to an embodiment of the present disclosure. In the thermomechanical actuator 300, a solar heat collector 302 is embodied as a triangular tube with a front cover plate 304 and a back cover plate 306 being of an equilateral triangle shape. In some embodiments, each of the front cover plate 304 and the back cover plate 306 may be made of aluminum. In FIG. 3, a base 308 of the triangular tube faces upwards and is made of a transparent material. A piston 310 has a shape matching the triangular shape of each of the front cover plate 304 and the back cover plate 306. For example, the piston 310 may be embodied as a triangular plate. Further, a rod 312 passes through a center of each of the front cover plate 304, the back cover plate 306, and the triangular plate piston 310. In an example, the rod 312 may be perpendicular to the triangular plate piston 310. A plurality of springs 314 is connected to the back cover plate 306 and the piston 310, where each spring of the plurality of springs 314 is configured to contract linearly parallel to an axis of the triangular tube. As such, the triangular plate piston 310 is configured to slide along an interior surface of the triangular tube in line with the plurality of springs 314 and, as such, the rod 312 slides linearly parallel to the axis of the triangular tube. A bias load 316 is suspended from the front cover plate 304 via a pulley 318 and a cable 320. The cable 320 is routed through the front cover plate 304 and is connected to the bias load 316 and the piston 310. In some embodiments, a linear bearing 322 may be disposed at an aperture defined in the front cover plate 304, such that the rod 312 passes through the linear bearing 322. The presence of the linear bearing 322 may reduce forces acting on the rod 312 while the rod 312 moves linearly due to the movement of the piston 310.

Each of the thermomechanical actuator 100 described with respect to FIG. 1 and the thermomechanical actuator 300 of FIG. 3 is configured to harness solar heat radiation with aid of respective solar heat collector to focus the solar heat radiation onto the respective plurality of springs. The solar heat collector 102, 302 is configured to transfer the solar heat radiation to the plurality of springs 110, 314 via a convective and conductive process. As described earlier, during daytime, the springs 314 absorbs the solar radiation and contracts, and expands during the night time or during absence of the solar radiation. During the day, thermomechanical actuator 300 continues to receive solar radiation even after reaching the desired activation temperature, which becomes essential to ensure adequate activation temperature throughout the year since the ambient temperature and temperature of the thermomechanical actuator 300 vary significantly. In some embodiments, the interior surface of the solar heat collector 302 may include a reflective material configured to reflect the solar heat radiation onto the plurality of springs 314.

An actuation mechanism of the springs 314 includes five main phases. In a first phase, the springs 314 are under an austenite starting temperature (As) and are extended while the bias load 316 is at a home position. In a second phase, the springs 314 absorb adequate heat from solar radiation or the heat reflected thereon to reach (As) and begin contracting to pull the bias load 316. In a third phase, the springs 314 arrive at an austenite final temperature (Af), thereby reaching a maximum deflection under the bias load 316. In a fourth phase, the springs 314 dissipate the heat, where the dissipation allows the springs 314 to reach martensite start temperature (Ms) and expand as the bias load 316 pulls the piston 310. In a final phase, the springs 314 reach a martensite final temperature (Mf), letting the springs 314 return to an original expanded shape.

The bias load 316 provides a return function to the springs 314, where the return function includes a tensile force applied to the plurality of springs 314 by a mass of the bias load 316. That is, the tensile force draws the plurality of springs 314 back to their equilibrium position. It will be understood that the springs 314 tend to remain in a relaxed state, where the springs 314 are expanded. Such position is referred to as the "equilibrium position". In some embodiments, the plurality of springs 314 may exert a force in a range of about 2.95 N to about 11.8 N. In some embodiments, the plurality of springs 314 may be displaced in a range of about 30 mm to about 50 mm.

Figure 4:
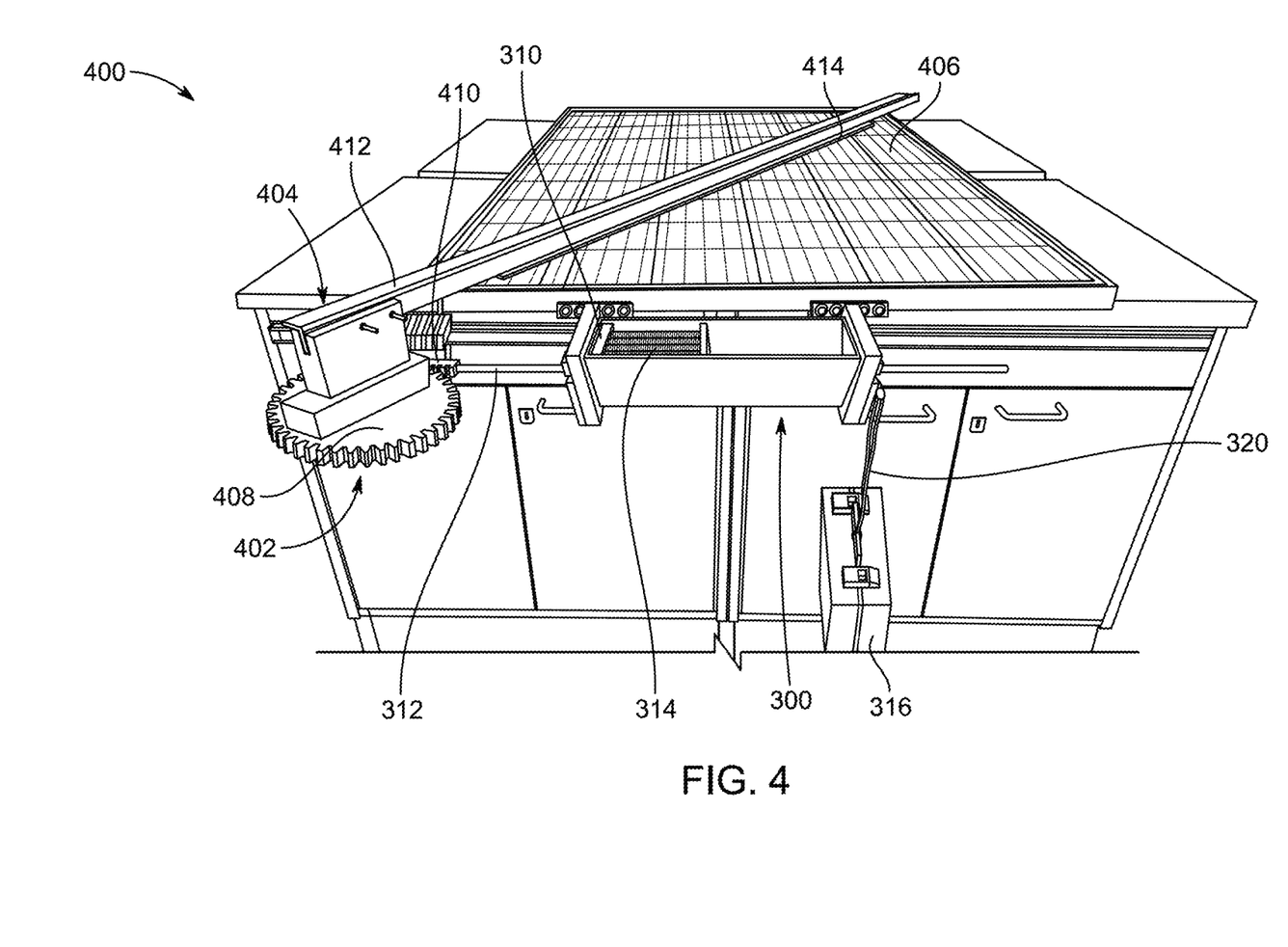
FIG. 4 illustrates a cleaning system implementing the thermomechanical actuator of FIG. 3, according to an embodiment of the present disclosure.

FIG. 4 illustrates a cleaning system 400, according to an embodiment of the present disclosure. The cleaning system 400 includes the thermomechanical actuator 300 described with respect to FIG. 3, a gear mechanism 402, a cleaning spindle 404, and a photovoltaic panel 406. The gear mechanism 402 includes a pinion 408 and a rack 410 mechanically attached to the pinion 408. The piston 310 of the thermomechanical actuator 300 is attached to the gear mechanism 402. Specifically, the piston 310 is attached to the rack 410 via the rod 312. The cleaning spindle 404 is attached to a top face of the pinion 408. Further, the thermomechanical actuator 300, the gear mechanism 402, and the cleaning spindle 404 are fixed to the photovoltaic panel 406.

Figure 5:
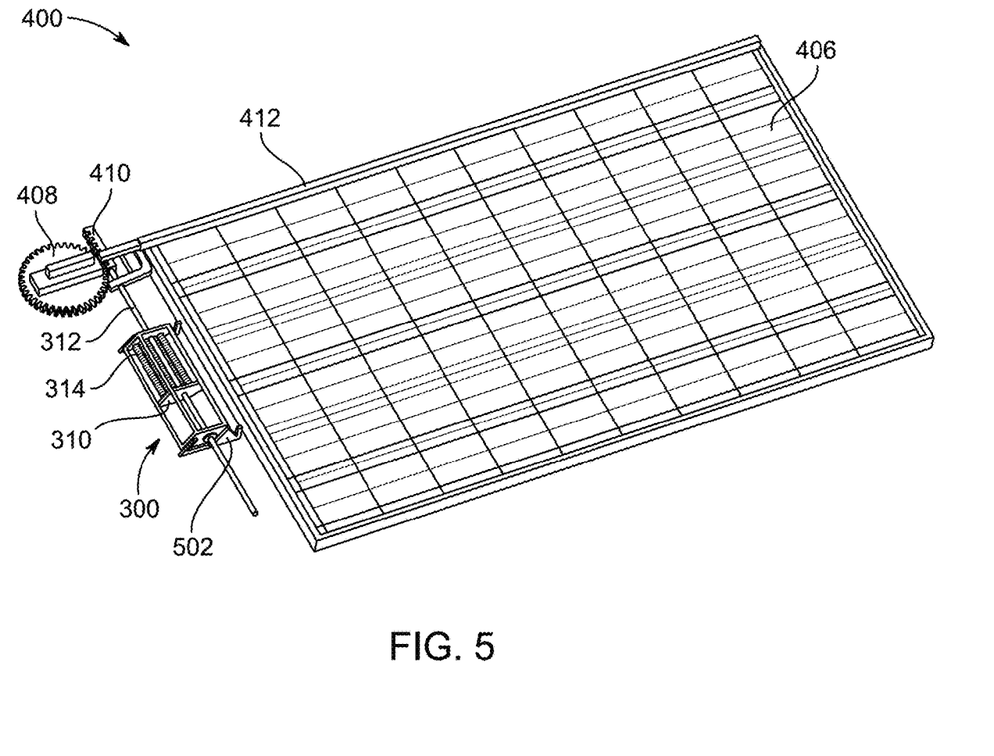
FIG. 5 illustrates a perspective of the cleaning system, according to an embodiment of the present disclosure.

In an embodiment, the cleaning spindle 404 includes a linear rod 412 extending across a length of one side of the photovoltaic panel 406 (as shown in FIG. 5) and resting on a face of the photovoltaic panel 406. The linear rod 412 is configured to rotate for about 90 degrees along the face of the photovoltaic panel 406. FIG. 4 illustrates the linear rod 412 of the cleaning spindle 404 rotated to about 45 degrees along the face of the photovoltaic panel 406. In some embodiments, the cleaning spindle 404 may include a linear brush 414 fixed along an underside of the linear rod 412. In order to achieve the 90 degrees rotation of the linear rod 412, the gear mechanism 402 is attached to a corner of the photovoltaic panel 406 and the thermomechanical actuator 300 is centrally attached to a side of the photovoltaic panel 406 (as shown in FIG. 4 and FIG. 5). As such, the rod 312 of the thermomechanical actuator 300 extends parallel to the side of the photovoltaic panel 406 and the pinion 408 is rotated by the rod 312 via the rack 410.

FIG. 5 illustrates a perspective view of the cleaning system 400. The thermomechanical actuator 300 is fixed to the side of the photovoltaic panel 406 with supports 502. Due to contraction of the springs 314 during the daytime, the piston 310 linearly travels in a direction of contraction of the springs 314. Since the rod 312 is fixed to the piston 310, the rod 312 also travels along with the piston 310, thereby causing movement of the rack 410 in a direction away from the thermomechanical actuator 300. Such movement of the rack 410 causes the pinion 408 to rotate in an anti-clockwise direction with respect to the thermomechanical actuator 300, thereby resulting in pivotal movement of the linear rod 412 along the face of the photovoltaic panel 406, where the linear rod 412 slides towards a side of the photovoltaic panel 406 from the 45-degree position shown in FIG. 4. During such movement of the linear rod 412, dust particles settled on the face of the photovoltaic panel 406 are cleared by the linear brush 414 and deposited at the side of the photovoltaic panel 406. During the night, the springs 314 expand and the piston 310, the rod 312, and the rack 410 are moved in a direction of expansion of the springs 314. As such, the rack 410 causes the pinion 408 to rotate in a clockwise direction with respect to the thermomechanical actuator 300, thereby causing the linear rod 412 to return to the 45-degree position shown in FIG. 4. Therefore, the thermomechanical actuator 300 achieves a single cleaning cycle every day and prevents dust accumulation on the surface of the photovoltaic panel 406. The thermomechanical actuator 300, the gear mechanism 402, and the cleaning spindle 404 may be detached from the photovoltaic panel 406 and mounted to another side of the photovoltaic panel 406 to achieve completion of the cleaning of the face thereof. As such, the thermomechanical actuator 300 and the cleaning system 400 implementing the thermomechanical actuator 300 may be employed for cleaning large photovoltaic panels or any other flat surfaces which require cleaning. In some embodiments, the linear rod 412 may be replaced with a wavery rod or a rod having any other shape and dimension to cater to cleaning of other non-planer surfaces.

In some embodiments, the cleaning system 400 may include a plurality of the thermomechanical actuators (such as the thermomechanical actuator 300), a plurality of gear the mechanisms (such as the gear mechanism 402), and a plurality of the cleaning spindles (such as the cleaning spindle 404). The plurality of thermomechanical actuators may be fixed to a plurality of sides of the photovoltaic panel, the plurality of gear mechanisms may be fixed to the plurality of thermomechanical actuators, and the plurality of cleaning spindles may be fixed to the plurality of gear mechanisms to achieve simultaneous cleaning of the photovoltaic panel.

In some embodiments, the solar heat collector 302 of the thermomechanical actuator 300 may be provided in three different configurations. In a first configuration, the solar heat collector 302 may be embodied as a cylindrical tube having a circular front cover, a cylindrical central volume, and a circular back cover. In a second configuration, the solar heat collector 302 may be embodied as a triangular tube having an equilateral triangular front cover, a triangular central volume, and an equilateral triangular back cover. In a third configuration, the solar heat collector 302 may be embodied as an isosceles trapezoid tube having an isosceles trapezoid front cover, an isosceles trapezoid central volume, and an isosceles trapezoid back cover.

To this end, the present disclosure provides a solar-driven thermomechanical shape memory alloy actuator that utilizes the solar radiation energy and transforms the thermal energy into mechanical energy. As such, the present disclosure provides offer a smart, simple, and cost-effective, and eco-friendly solution that may be easily implemented in the cleaning systems for solar applications. The thermomechanical actuator of the present disclosure is self-driven and, therefore, eliminates human interaction and requirement of external electrical energy. The thermomechanical actuator and the cleaning system of the present disclosure may be implemented in various solar system applications, such as solar panels cleaning, solar tracking mechanisms, and thermal protection systems; and for cleaning building windows, smart curtains, and self-operating sunshades.

As used herein, the terms "a" and "an" and the like carry the meaning of "one or more."

Numerous modifications and variations of the present invention are possible in light of the above teachings. It is, therefore, to be understood that, within the scope of the appended claims, the invention may be practiced otherwise than as specifically described herein.

The invention claimed is:

1. A PV cleaning system with rack and pinion wiper, comprising:

a gear mechanism, a cleaning spindle, a photovoltaic panel, and a thermomechanical actuator, wherein the thermomechanical actuator comprises:
a piston, a solar heat collector, a plurality of springs, a rod, a pulley, a bias load, and a cable, wherein the piston of the thermomechanical actuator is attached to the gear mechanism, the gear mechanism comprising a rack and a pinion, the rack mechanically attaching to the pinion, wherein the cleaning spindle is attached to a top face of the pinion, wherein the thermomechanical actuator, the gear mechanism, and the cleaning spindle are fixed to the photovoltaic panel, wherein the solar heat collector of the thermomechanical actuator is a triangular tube comprising a triangular front cover, a triangular central volume, and a triangular back cover, wherein the piston is in the form of a triangular plate matching the triangular front cover and the triangular back cover, and wherein the rod is configured to slide linearly parallel to an axis of the triangular tube, wherein the rack and the pinion are configured such that movement of the rack causes the pinion to rotate in an anti-clockwise direction with respect to the thermomechanical actuator.

2. The cleaning system of claim 1, wherein the cleaning spindle comprises a linear rod extending across the length of one side of the photovoltaic panel, the spindle attaching to the face of the pinion, the spindle rotating 90-degrees across the face of the photovoltaic panel.

3. The cleaning system of claim 1, wherein the rod of the thermomechanical actuator is configured to pass through the gear mechanism, the rod of the thermomechanical actuator being attached to the gear mechanism, the rod being mechanically attached to the rack of the gear mechanism, the rack is fixed to the pinion, the extension of the rod rotating the pinion via the rack.

4. The cleaning system of claim 1, wherein the thermomechanical actuator is centrally attached to a side of the photovoltaic panel, the rod of the thermomechanical actuator extending in parallel with the side of the photovoltaic panel, wherein the gear mechanism is attached to a corner of the photovoltaic panel, wherein the cleaning spindle rests on a face of the photovoltaic panel.

5. The cleaning system of claim 1, comprising:
a plurality of the thermomechanical actuators, a plurality of the gear mechanisms, and a plurality of the cleaning spindles, the plurality of thermomechanical actuators fixed to a plurality of sides of the photovoltaic panel, the plurality of gear mechanisms fixed to the plurality of thermomechanical actuators, the plurality of cleaning spindles fixed to the plurality of gear mechanisms.

6. The cleaning system of claim 1, wherein the cleaning spindle has a linear brush fixed along an underside of the cleaning spindle.

* * * * *